(12) United States Patent
Goldsborough et al.

(10) Patent No.: US 10,602,727 B2
(45) Date of Patent: Mar. 31, 2020

(54) AUTOMATED AQUACULTURE HARVESTING SYSTEM

(71) Applicants: FOREVER OCEANS CORPORATION, Warrenton, VA (US); Mathew Goldsborough, Kailua Kona, HI (US); Gavin Key, Kailua Kona, HI (US); Neil Sims, Kailua Kona, HI (US); Joseph Denny, Kailua Kona, HI (US); Jason Heckathorn, Nokesville, VA (US)

(72) Inventors: Mathew Goldsborough, Kailua Kona, HI (US); Gavin Key, Kailua Kona, HI (US); Neil Sims, Kailua Kona, HI (US); Joseph Denny, Kailua Kona, HI (US); Jason Heckathorn, Nokesville, VA (US)

(73) Assignee: FOREVER OCEANS CORPORATION, Warrenton, VA (US)

( * ) Notice: Subject to any disclaimer, the term of this patent is extended or adjusted under 35 U.S.C. 154(b) by 265 days.

(21) Appl. No.: 15/552,093

(22) PCT Filed: Feb. 18, 2016

(86) PCT No.: PCT/US2016/018438
§ 371 (c)(1),
(2) Date: Aug. 18, 2017

(87) PCT Pub. No.: WO2016/134128
PCT Pub. Date: Aug. 25, 2016

(65) Prior Publication Data
US 2018/0042205 A1    Feb. 15, 2018

Related U.S. Application Data

(60) Provisional application No. 62/118,175, filed on Feb. 19, 2015.

(51) Int. Cl.
*A01K 79/00* (2006.01)
*A01K 61/60* (2017.01)
(Continued)

(52) U.S. Cl.
CPC ............. *A01K 79/00* (2013.01); *A01K 61/60* (2017.01); *A01K 73/12* (2013.01); *A01K 73/04* (2013.01); *Y02A 40/826* (2018.01)

(58) Field of Classification Search
CPC ........ A01K 73/04; A01K 73/12; A01K 79/00; A01K 61/60
(Continued)

(56) References Cited

U.S. PATENT DOCUMENTS 2,693,161 A * 11/1954 Stubbs .................. A01K 73/12
114/241
3,553,879 A * 1/1971 Ellis ....................... A01K 73/00
43/8
(Continued)

FOREIGN PATENT DOCUMENTS

CL   2017002124 A1   3/2018
JP   63-273427 A    11/1988
(Continued)

OTHER PUBLICATIONS

European Search Report application No. 16753046.8 dated Nov. 16, 2018.
(Continued)

*Primary Examiner* — Christopher D Hutchens
(74) *Attorney, Agent, or Firm* — Squire Patton Boggs (US) LLP

(57) ABSTRACT

A system and method for automatically harvesting fish from an aquaculture cage is provided. Underwater robotic rovers draw out a large net from a protective enclosure. The net is manipulated to corral or concentrate the fish into a smaller
(Continued)

volume. Transponders installed at strategic locations throughout the cage facilitate navigation of the rovers.

20 Claims, 4 Drawing Sheets

(51) Int. Cl.
  *A01K 73/12* (2006.01)
  *A01K 73/04* (2006.01)
(58) Field of Classification Search
  USPC .................................................. 119/202, 219
  See application file for complete search history.

(56) References Cited

U.S. PATENT DOCUMENTS

| | | | | |
|---|---|---|---|---|
| 3,687,418 A | * | 8/1972 | Halvorsen | A01K 73/06 |
| | | | | 254/279 |
| 4,193,219 A | * | 3/1980 | Pogue | A01K 73/12 |
| | | | | 43/106 |
| 4,467,743 A | * | 8/1984 | Dugan | A01K 73/12 |
| | | | | 119/207 |
| 4,481,904 A | * | 11/1984 | Fletcher | E02B 1/006 |
| | | | | 119/219 |
| 5,491,922 A | * | 2/1996 | Sanders | A01K 79/00 |
| | | | | 210/242.1 |
| 6,216,635 B1 | | 4/2001 | McRobert | |
| 7,836,633 B2 | | 11/2010 | Wilcox | |
| 8,635,730 B2 | | 1/2014 | Heard | |
| 2006/0096548 A1 | | 5/2006 | Ytterland et al. | |

FOREIGN PATENT DOCUMENTS

| | | |
|---|---|---|
| WO | WO 01/93670 A1 | 12/2001 |
| WO | WO 2004/016079 A1 | 2/2004 |
| WO | 2016134133 A1 | 8/2016 |

OTHER PUBLICATIONS

International Search Report & Written Opinion dated Apr. 21, 2016 corresponding to International Patent Application No. PCT/US2016/018438.

Panamanian Office Action, Substantive Examination Report application No. 91748-01 dated Sep. 6, 2018.

Chilean Office Action application No. 201702121 dated Dec. 10, 2018.

Office Action issued in corresponding Chilean Patent Application No. 201702121, dated Jul. 29, 2019.

* cited by examiner

AUTOMATED AQUACULTURE HARVESTING SYSTEM

CROSS-REFERENCE TO RELATED APPLICATIONS

This application claims priority from U.S. Provisional Application No. 62/118,175, filed on Feb. 19, 2015. The entire contents of this earlier filed application are hereby incorporated in their entirety.

FIELD

Certain embodiments generally relate to robotics, and more specifically, relate to the use of robotic systems in the harvesting of fish from an aquaculture cage.

BACKGROUND

Harvesting fish from an aquaculture cage, particularly if it is submerged, or in inclement weather, is a laborious, costly and sometimes dangerous process. Conventional harvesting techniques call for the manipulation of large nets within a cage, thereby corralling and concentrating fish to a predetermined location within the cage. Once sufficiently condensed, fish are removed manually with nets or automatically using a combination of pumps and motors. This lengthy procedure results in extended periods of crowding and inducing stress on the remaining unharvested fish, resulting in loss of appetite, decreased growth rate and greater vulnerability to infection. These conventional harvesting techniques can also have an adverse affect on the quality of the harvested fish, ultimately reducing the profitability of the farm.

BRIEF DESCRIPTION OF THE DRAWINGS

For proper understanding of the invention, reference should be made to the accompanying drawings, wherein.

DETAILED DESCRIPTION

Figure 1:
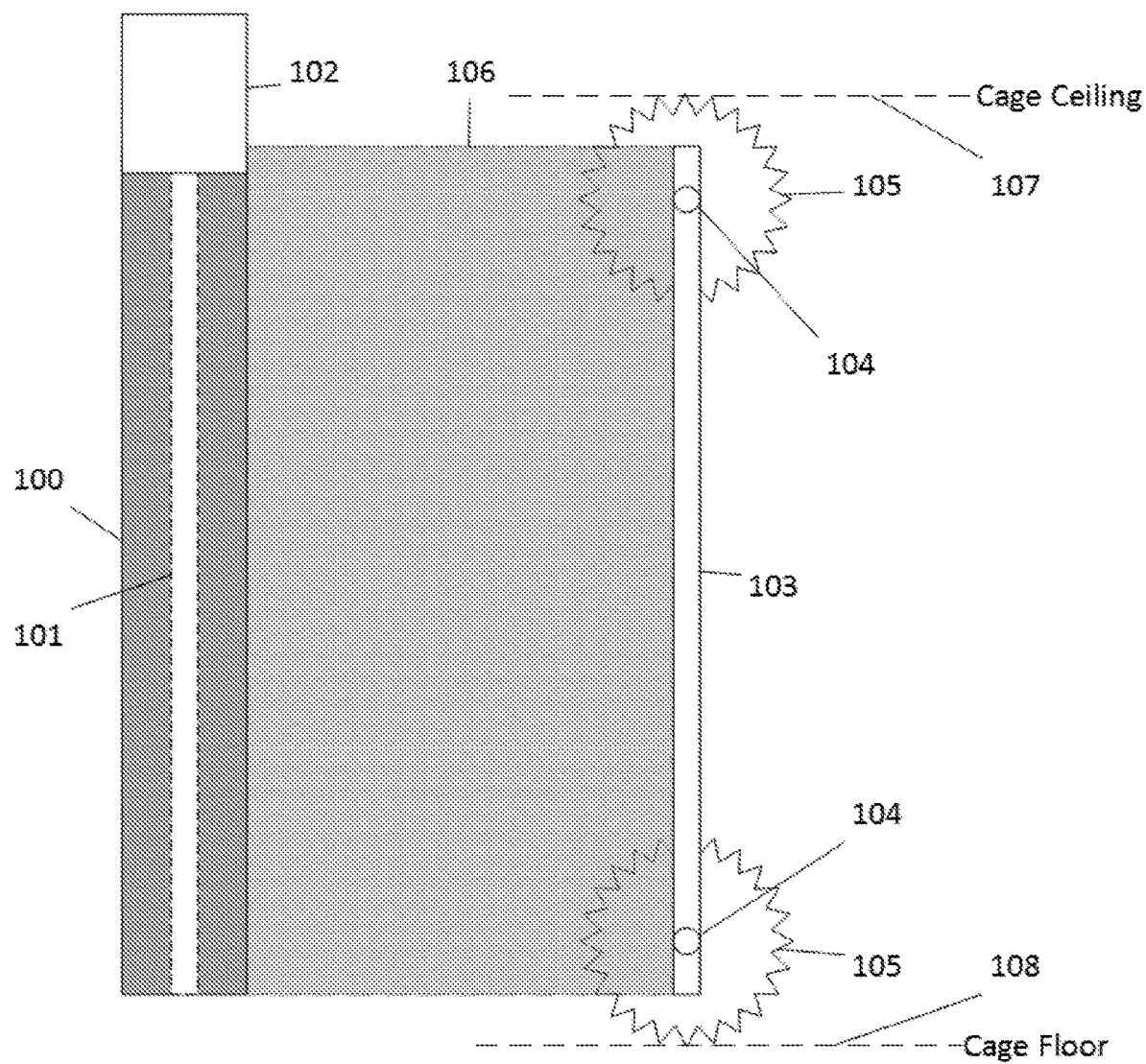
FIG. 1 illustrates a profile elevation view of an automated harvester, according to one embodiment.

It will be readily understood that the components of the invention, as generally described and illustrated in the figures herein, may be arranged and designed in a wide variety of different configurations. Thus, the following detailed description of certain embodiments of an automated harvesting system and method, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different configurations and functions discussed below may be performed in a different order and/or concurrently with each other. Furthermore, if desired, one or more of the described configurations or functions may be optional or may be combined. As such, the following description should be considered as merely illustrative of the principles, and embodiments of this invention, and not in limitation thereof.

Aquaculture cages can operate in two configurations: either floating at the surface, or submerged below the surface. Harvesting from traditional surface cages affords easy access to the cage where operators can make use of a service vessel using winches, booms, and seine nets to assist in the harvesting of the fish. However, these cages are generally challenging to operate in exposed open-ocean waters. Even under ideal conditions, open-ocean surface harvesting exposes both farm equipment and fish to the high energy environment of the wave zone, risking potential damage and loss; in more inclement weather, harvest operations may not be possible at all, leading to costly disruptions in the product supply chain.

Submersible aquaculture cages provide security and survivability in the open ocean, but existing submersible cage technologies are highly inefficient to operate. As these cages must be entirely enclosed, it is far more difficult to manipulate or manage the fish inside the cage. Small access panels and enclosed cage shapes together reduce an operators' ability to apply mechanical advantage when herding or harvesting the fish. Placing divers inside submerged cages, particularly in high sea states or in strong currents, poses an even greater risk as divers could become trapped in the cage.

There is, therefore, a need to automate harvesting of submerged and surface pens in almost all sea states, without using divers.

According to certain embodiments of the invention, guided by sensors, two autonomous robotic rovers will deploy a large seine net, drawing it across an aquaculture cage to pre-defined points along the cage rim, then back towards the base unit to corral or crowd a desired volume of the fish. The robotic rovers may move across the net material by physically gripping and holding onto the mesh. In an embodiment, an array of sensors and closed-loop feedback control will enable the system to unfurl a net and pull it uniformly to any point within the cage. An integrated winch allows the net to be retrieved after harvesting is complete.

FIG. 1 illustrates an elevation view of one embodiment of the automated harvesting system. As illustrated in the example of FIG. 1, two automated robotic rovers 105, one at the top and one at the bottom of the leading edge of a seine net 106, navigate across an aquaculture cage and draw out the net to any number of locations. To facilitate dead reckoning navigation, sensors 104 within the body of the rover 105 may detect sensors or transponders embedded within the cage ceiling. In another embodiment, sensors or transponders may be embedded within the cage floor 108. Treaded wheels on the rover 105, which may grip the cage ceiling 107 and/or cage floor 108, provide traction and allow the rovers to move about the cage freely. In one embodiment, the treads, or mechanism by which the cage is gripped, may be extended to grip the mesh and retracted to release the mesh. A drivetrain within the rover body 104 supplies the power required to turn the wheels.

The automated robotic rovers 105 may be connected on either end of a vertical spar 103 attached to the leading edge of a net 106. In one example, the spar may be made of high-density polyethylene (HDPE). However, other materials may be used according to other embodiments. The height of the vertical spar 103 may be roughly equal to the height of the cage. However, under different stresses the shape of the cage may change. The spar 103 may compensate by dynamically changing its height (telescoping) in order to maintain a vertical orientation within the pen and keep the automated robotic rovers in contact with the ceiling and floor mesh material. In one embodiment, the spar may accomplish this through integrated springs. In another embodiment, the spar may change its height through the use of hydrostatic pressure.

The base unit 100 may be comprised of a protective casing enclosing the net spool 101 with an integrated winch 102. This base unit 100 may be placed vertically inside the cage along the wall. The height of the net 106 may be equal to the depth of the net pen (i.e., aquaculture cage) and its width may be slightly greater than the diameter of the net pen (i.e., aquaculture cage), allowing the automated harvesting system to bisect the cage without placing any stress on the net.

In one embodiment, sensors may be installed on the vertical spar 103 to help detect and react to changes in the pitch, roll, and yaw of the spar facilitating closed loop feedback control.

In yet another embodiment, encoders which track angular movement, may be installed on the axles of the robotic rovers 104 facilitating closed loop feedback control.

Figure 2:
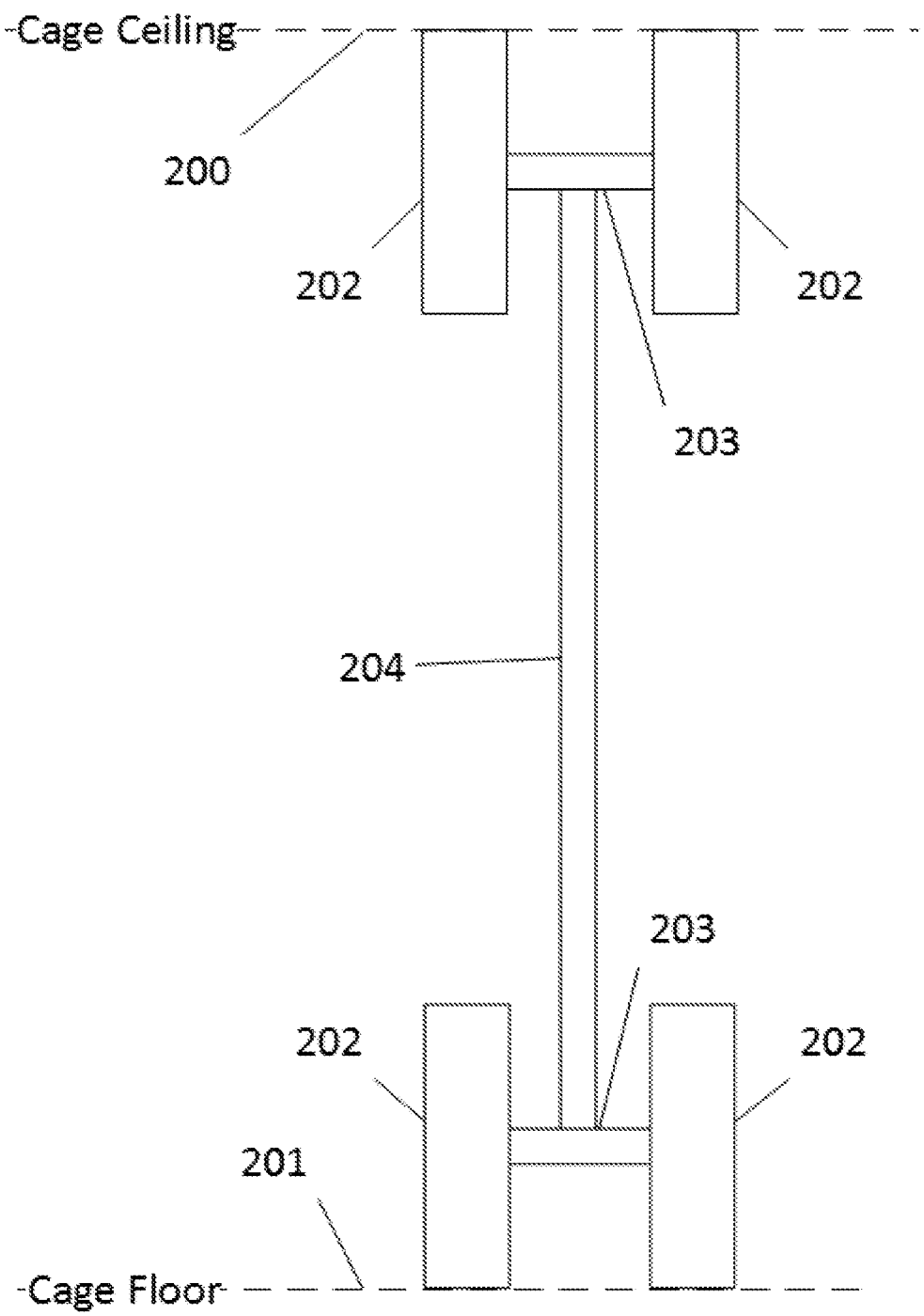
FIG. 2 illustrates a front elevation view of an automated harvester, according to an embodiment.

FIG. 2 illustrates a front elevation view of one embodiment of the automated harvester. As illustrated in the example of FIG. 2, two circular wheels 200 are connected to each other through a fixed axle 203. The drivetrain may be enclosed within the body of the robotic rover 203 along within navigational sensors. A variable-length spar 204 will ensure the wheels 202 are kept in contact with both the cage ceiling 200 and floor 201. In another embodiment, the rovers may include a single wheel and axle connected to the rover body through a hub. In yet another embodiment, the robotic rovers wheels' 202 grip and navigate throughout the cage through the use of a continuous track system.

Figure 3:
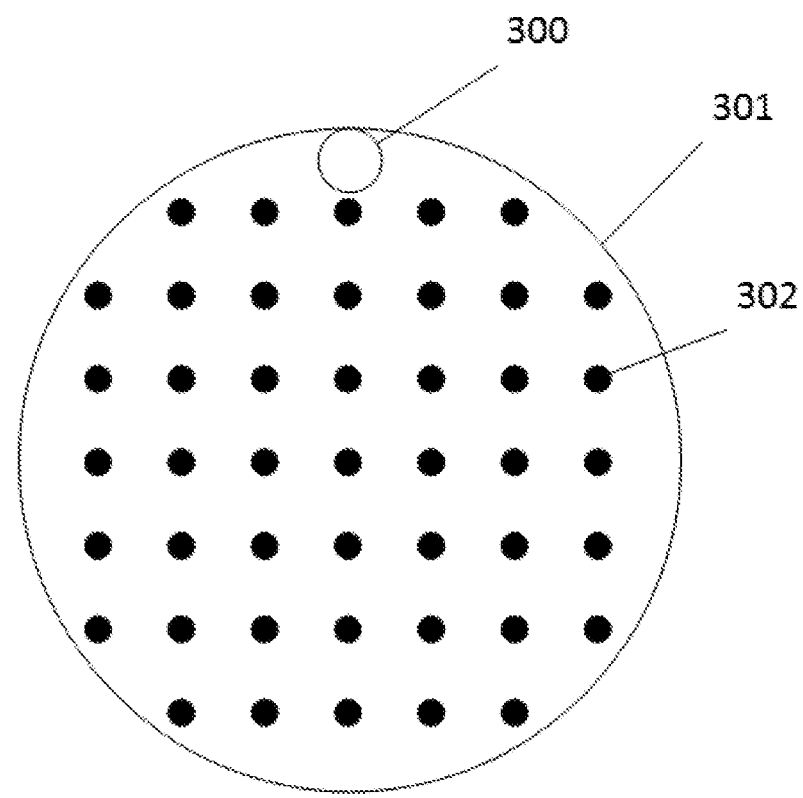
FIG. 3. illustrates a plan view of a circular aquaculture cage, according to an embodiment.

FIG. 3 illustrates a plan view of one embodiment of the automated harvester 300 and the navigational sensors or transponders 302 installed on a circular aquaculture cage 301. As illustrated in the example of FIG. 3, the transponders or navigational sensors 302 may be aligned in a grid formation and detected by sensors installed within the robotic rovers body 105 facilitating dead reckoning navigation. In another embodiment, the sensors 302 may be installed around the perimeter of the cage to reduce signal noise and interference.

Figure 4:
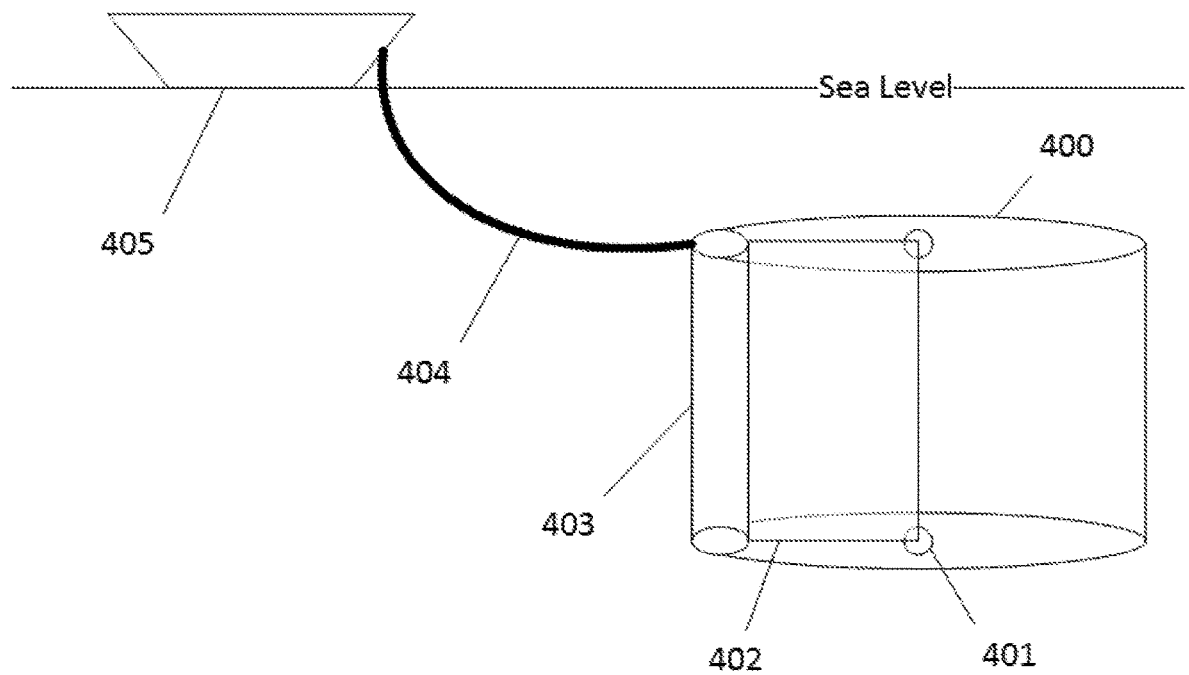
FIG. 4. illustrates an elevation view of an automated harvester with an attached harvest pipe, according to an embodiment.

FIG. 4 illustrates the automated harvesting system installed on a submerged aquaculture cage 400, according to one embodiment. As illustrated in the example of FIG. 4, the robotic rovers 401 navigate across the cage drawing the net 402 from its protective enclosure 403. An integrated harvesting tub 404 allows fish to be pumped to the surface from a harvest vessel 405.

In another embodiment, the automated harvesting system may be installed on a surface pen without any additional equipment (e.g., integrated harvesting tube 404) requiring fish to be scooped out through nets or some other means.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An automated aquaculture system, comprising:
   an aquaculture cage;
   at least two autonomous robotic rovers; and
   a base unit;
   wherein the at least two autonomous robotic rovers are configured to deploy a seine net by drawing the net from the base unit across the aquaculture cage to pre-defined points along a rim of the aquaculture cage and then back towards the base unit to corral a desired volume of fish from the aquaculture cage.

2. The system according to claim 1, wherein the autonomous robotic rovers are configured to move across the net by physically gripping and holding onto a mesh of the net.

3. The system according to claim 1, further comprising an array of transponders installed on a ceiling and/or floor of the aquaculture cage and closed-loop feedback control, wherein the transponders and closed-loop feedback control enable the autonomous robotic rovers to unfurl the net and pull the net uniformly to any point within the aquaculture cage.

4. The system according to claim 3, wherein the autonomous robotic rovers comprise sensors to detect the transponders that are embedded within a ceiling or floor of the aquaculture cage.

5. The system according to claim 3, wherein the transponders are aligned in a grid formation and detected by sensors installed within the autonomous robotic rovers to facilitate dead reckoning navigation, or wherein the transponders are installed around the perimeter of the cage to reduce signal noise and interference.

6. The system according to claim 1, further comprising an integrated winch configured to retrieve and store the net after harvesting of the fish is completed.

7. The system according to claim 1, wherein one of the autonomous robotic rovers is positioned at a top of a leading edge of the net, and another one of the autonomous robotic rovers is positioned at a bottom of a leading edge of the net.

8. The system according to claim 1, wherein the autonomous robotic rovers comprise treaded wheels configured to grip at least one of a floor or ceiling of the aquaculture cage to provide traction and allow the autonomous robotic rovers to move about the aquaculture cage.

9. The system according to claim 1, further comprising a vertical spar attached to a leading edge of the net, wherein the vertical spar is configured to dynamically change a height of the vertical spar in order to maintain a vertical orientation within the aquaculture cage and keep the automated robotic rovers in contact with the ceiling and floor of the aquaculture cage.

10. The system according to claim 1, wherein the base unit is configured to enclose a net spool with an integrated winch, wherein the base unit is placed vertically inside the aquaculture cage along a wall of the aquaculture cage, wherein a height of the net is equal to a depth of the aquaculture cage and a width of the net is slightly greater than the diameter of the aquaculture cage to allow the autonomous robotic rovers to bisect the cage without placing any stress on the net.

11. An automated aquaculture method, comprising:
deploying, by at least two autonomous robotic rovers, a seine net by drawing the net from a base unit across an aquaculture cage to pre-defined points along a rim of the aquaculture cage and then back towards the base unit to corral a desired volume of fish from the aquaculture cage.

12. The method according to claim 11, wherein the deploying further comprises moving the autonomous robotic rovers across the net by physically gripping and holding onto a mesh of the net.

13. The method according to claim 11, further comprising disposing an array of transponders on a ceiling and/or floor of the aquaculture cage, and wherein the transponders and closed-loop feedback control enables the autonomous robotic rovers to unfurl the net and pull the net uniformly to any point within the aquaculture cage.

14. The method according to claim 13, further comprising detecting, by sensors embedded in the autonomous robotic rovers, the transponders that are embedded within a ceiling or floor of the aquaculture cage.

15. The method according to claim 13, wherein the transponders are aligned in a grid formation and detected by sensors installed within the autonomous robotic rovers to facilitate dead reckoning navigation, or wherein the transponders are installed around the perimeter of the cage to reduce signal noise and interference.

16. The method according to claim 11, further comprising retrieving and storing, by an integrated winch, the net after harvesting of the fish is completed.

17. The method according to claim 11, further comprising positioning one of the autonomous robotic rovers at a top of a leading edge of the net, and positioning another one of the autonomous robotic rovers at a bottom of a leading edge of the net.

18. The method according to claim 11, wherein the autonomous robotic rovers comprise treaded wheels configured to grip at least one of a floor or ceiling of the aquaculture cage to provide traction and allow the autonomous robotic rovers to move about the aquaculture cage.

19. The method according to claim 11, further comprising attaching a vertical spar to a leading edge of the net, wherein the vertical spar is configured to dynamically change a height of the vertical spar in order to maintain a vertical orientation within the aquaculture cage and keep the automated robotic rovers in contact with the ceiling and floor of the aquaculture cage.

20. The method according to claim 11, wherein the base unit is configured to enclose a net spool with an integrated winch, wherein the base unit is placed vertically inside the aquaculture cage along a wall of the aquaculture cage, wherein a height of the net is equal to a depth of the aquaculture cage and a width of the net is slightly greater than the diameter of the aquaculture cage to allow the autonomous robotic rovers to bisect the cage without placing any stress on the net.

* * * * *